(12) United States Patent
Mower et al.

(10) Patent No.: US 8,259,616 B2
(45) Date of Patent: Sep. 4, 2012

(54) DECOMPOSITION OF NETWORKING DEVICE CONFIGURATION INTO VERSIONED PIECES EACH CONDITIONALLY APPLIED DEPENDING ON EXTERNAL CIRCUMSTANCES

(75) Inventors: Carl Steven Mower, Sunnyvale, CA (US); Matthew Alan Palmer, Menlo Park, CA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/357,384

(22) Filed: Jan. 21, 2009

(65) Prior Publication Data
US 2009/0190498 A1 Jul. 30, 2009

Related U.S. Application Data

(60) Provisional application No. 61/021,885, filed on Jan. 17, 2008.

(51) Int. Cl.
*H04L 12/28* (2006.01)
(52) U.S. Cl. ....................................... 370/254
(58) Field of Classification Search .................. None
See application file for complete search history.

(56) References Cited

U.S. PATENT DOCUMENTS

| | | | |
|---|---|---|---|
| 5,832,503 A * | 11/1998 | Malik et al. ........... | 709/223 |
| 5,872,928 A * | 2/1999 | Lewis et al. ........... | 709/222 |
| 6,011,910 A | 1/2000 | Chau et al. | |
| 6,799,272 B1 | 9/2004 | Urata | |
| 7,131,141 B1 | 10/2006 | Blewett et al. | |
| 7,207,061 B2 | 4/2007 | Martin | |
| 7,499,438 B2 | 3/2009 | Hinman et al. | |
| 7,546,632 B2 | 6/2009 | Stieglitz et al. | |
| 7,751,392 B1 | 7/2010 | Gonzalez et al. | |
| 7,865,577 B1 | 1/2011 | O'Neil et al. | |
| 7,865,727 B2 | 1/2011 | Zeng et al. | |
| 2002/0194369 A1 * | 12/2002 | Rawlins et al. ........... | 709/238 |
| 2003/0009689 A1 | 1/2003 | Kolb | |
| 2003/0048750 A1 | 3/2003 | Kobayashi | |
| 2003/0074429 A1 * | 4/2003 | Gieseke et al. ........... | 709/221 |
| 2003/0117951 A1 | 6/2003 | Wiebe et al. | |
| 2003/0120624 A1 * | 6/2003 | Poppenga et al. ........... | 707/1 |
| 2003/0212908 A1 | 11/2003 | Piesco | |
| 2004/0098472 A1 * | 5/2004 | Styles et al. ........... | 709/221 |
| 2004/0205201 A1 | 10/2004 | Katsube et al. | |
| 2005/0192969 A1 | 9/2005 | Haga et al. | |
| 2005/0246346 A1 | 11/2005 | Gerdes et al. | |
| 2006/0167988 A1 * | 7/2006 | Barck et al. ........... | 709/203 |
| 2006/0200856 A1 | 9/2006 | Salowey et al. | |
| 2006/0236093 A1 * | 10/2006 | Brok et al. ........... | 713/151 |
| 2007/0043860 A1 | 2/2007 | Pabari | |
| 2007/0136804 A1 | 6/2007 | Ohsawa et al. | |
| 2007/0274285 A1 * | 11/2007 | Werber et al. ........... | 370/351 |
| 2008/0002823 A1 * | 1/2008 | Fama et al. ........... | 379/265.12 |
| 2008/0046995 A1 | 2/2008 | Satterlee et al. | |
| 2009/0112734 A1 | 4/2009 | Viehmann et al. | |
| 2009/0164579 A1 | 6/2009 | Chaudhry | |
| 2009/0276530 A1 | 11/2009 | Gentry et al. | |
| 2009/0296604 A1 | 12/2009 | Karaoguz et al. | |
| 2009/0327398 A1 | 12/2009 | Campbell et al. | |

* cited by examiner

*Primary Examiner* — Yong Zhou
(74) *Attorney, Agent, or Firm* — Sheppard Mullin Richter & Hampton LLP

(57) ABSTRACT

A method of configuring a networking device comprises: collecting data regarding the networking device; conveying the data to a remote server; selecting configuration slice instances based on the data using the server, wherein templates for the slice instances are stored on the server; compiling the configuration slice instances using the server; and delivering the compiled configuration slice instances to the networking device; wherein the slice instances are coherent sub-sections of configuration settings for the networking device.

20 Claims, 2 Drawing Sheets

DECOMPOSITION OF NETWORKING DEVICE CONFIGURATION INTO VERSIONED PIECES EACH CONDITIONALLY APPLIED DEPENDING ON EXTERNAL CIRCUMSTANCES

CROSS-REFERENCE TO RELATED APPLICATIONS

This application claims the benefit of U.S. Provisional Application Ser. No. 61/021,885, filed Jan. 17, 2008, which is expressly incorporated by reference herein.

BACKGROUND

1. Field of the Invention

The present invention relates generally to networking device configuration and more specifically to methods for network environment dependent configuration of devices.

2. Description of the Related Art

Configuration of networking devices is complex. This task is made even more complicated by the fact that the appropriate configuration settings are typically a function of the particular network environment in which the networking device finds itself. Today, the environment is appraised by an expert, a "network administrator," and a configuration is custom-built for that particular device. Unfortunately, any lessons learned from a single particular device are today not easy to apply to any and all other devices that may share that particular environment—this is a side-effect of the fact that many pieces of today's configurations are "copy-and-pasted" from other devices.

Most networking device configurations today are built device-by-device, "full custom", which is a very time-consuming process. Furthermore, even when that process has been completed, any changes that need to be propagated across many devices require that each device's configuration be individually modified.

Today's state of the art in configuration management often consists of "home-grown" scripts that assemble fractions of device configurations in unique combinations for each device according to that device's unique environment, as guided by a static rarely-changing input file describing those device contexts.

Today's solutions have no ability to adapt to the quickly changing environment of each device. Clearly, there is a need for more efficient ways for configuring devices in a network.

SUMMARY OF THE INVENTION

Rather than specifying a particular networking device's settings as one monolithic whole, according to embodiments of the present invention the settings are described as the union of a collection of configuration slices. The slices, which are portions of a full configuration for one networking device, are stored centrally, on a server. The different instances of each type of slice are combined at the server to make a full configuration for each networking device, and are then conveyed to each networking device. Each slice can still be updated, but all devices that reference that slice will then use the newest version of that slice. In this manner, a change to the slice instance is reflected across all devices for which that slice instance is appropriate.

According to aspects of the invention a method of configuring a networking device comprises: collecting data regarding the networking device; conveying the data to a remote server; selecting configuration slice instances based on the data using the server, wherein templates for the slice instances are stored on the server; compiling the configuration slice instances using the server; and delivering the compiled configuration slice instances to the networking device; wherein the slice instances are coherent sub-sections of configuration settings for the networking device.

BRIEF DESCRIPTION OF THE FIGURES

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
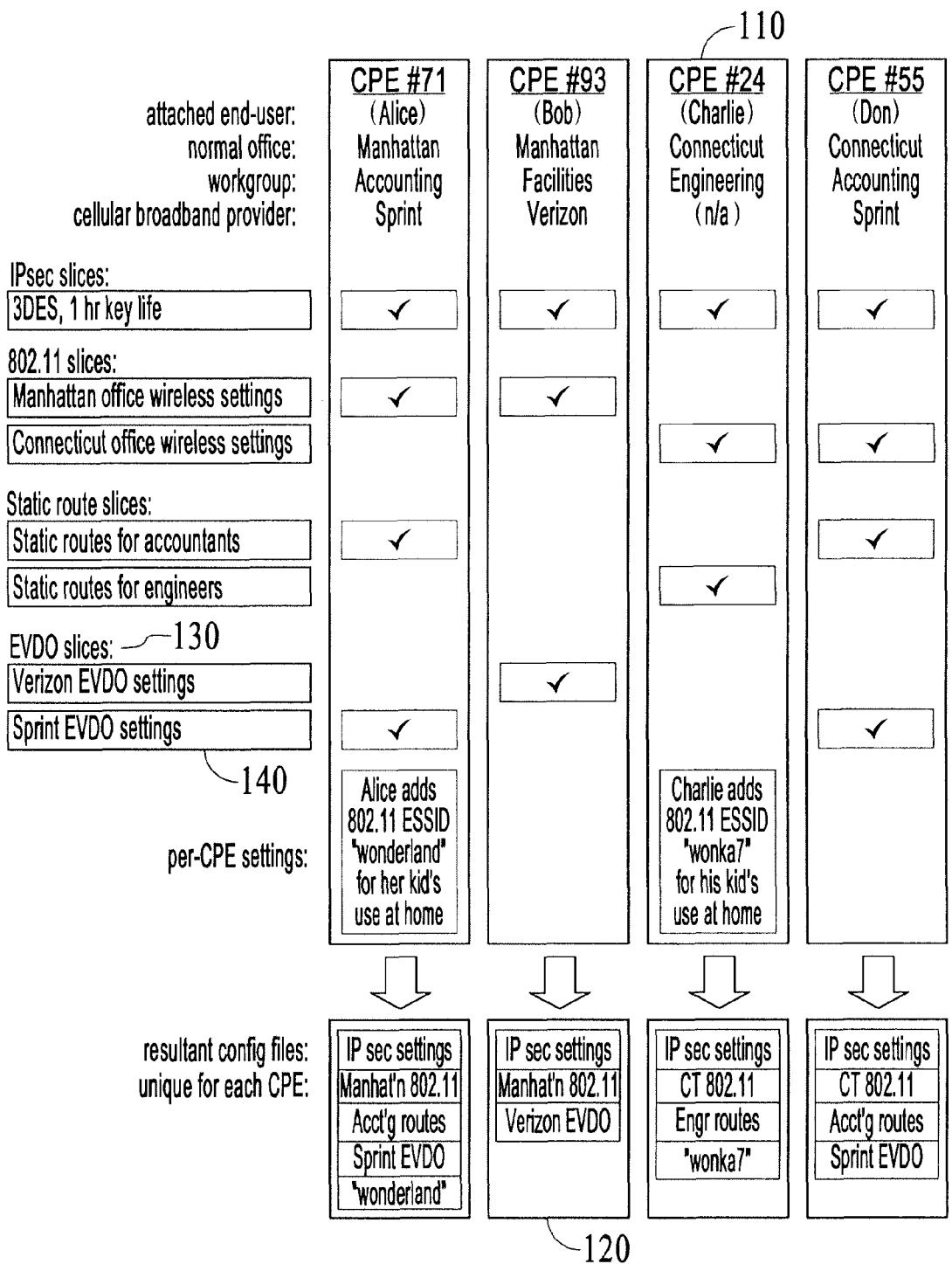
FIG. 1 shows an illustration of total device configuration comprising coherent sub-sections of configuration settings—"slices"—according to embodiments of the invention.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention are based on the concept of a device configuration which is comprised of discrete "slices", where each type of slice can have multiple "instances" each of which are versioned. For example, a device's total configuration may consist of coherent sub-sections of configuration settings such as settings related to the device's 802.11 wireless operation. These coherent sub-sections are referred to as "slices". Across a population of networking devices, there may be several sets of configuration settings that are appropriate, each slightly different from the others depending on the network environment of the particular networking device. For example, there could be a 802.11 configuration slice that describes the wireless settings sufficient to match the wireless environment found in the Manhattan office, and another slice that describes the characteristics of the Connecticut office. See FIG. 1. These two slices are identical in the types of configuration values they contain, but their exact values will differ. Each particular set of settings is the "slice instance". Such slice instances may also vary across time, as they evolve over the course of weeks or months. Therefore, such slice instances may also be versioned—that is a record is maintained of each version of that slice instance, what was changed, and who made the change.

The network referred to in this application is comprised of a server and one or more networking devices. The configuration of the networking devices is controlled centrally by a network management application on the server. Input into the methods described herein come from the human agent interacting with the network management application (for example to apply certain settings to some devices and not others), or from databases on other servers at other locations (for example a database that captures reporting structures for the target company), or from information collected by the networking devices (for example the capabilities of that networking hardware or information about the networks surrounding that networking device).

FIG. 1 shows an example of configurations 110 for four different networking devices—CPE #s 24, 55, 71 and 93. Each networking device provides networking services for a different end-user, with identified home office, workgroup and cellular broadband provider. The configurations are shown in the vertical columns, and a resultant configuration file 120, unique to each networking device, is also shown. The configurations are shown to be comprised of a number of slices 130—details of the slices for each networking device being shown in rows. Each slice has slice instances 140—particular settings which are network environment dependent. These slice instances consist of fractions of device configuration sufficient to express a single coherent fraction of a device's total configuration. The particular example shown in FIG. 1 shows some fraction of device configuration is common across all devices shown—the "IPsec" slice. In the case of 802.11 wireless settings, some devices receive the Manhattan settings while other devices receive the Connecticut settings, based on the workplace the associated user is based from—this is an example of slices being applied on the basis of the geographic location of the target devices. A different criteria under which a portion of the networking device configuration may be applied is the role of the human agent which the networking device services. In the figure, there are different "static route" slices for accountants and engineers. Yet another basis for deciding which networking devices receive which instances of a type of slice is a function of the attributes of the networking device itself. In FIG. 1, some devices are equipped with Sprint 3G cards while others are equipped with Verizon 3G cards.

The very heart of the configuration of customer premise equipment (CPE) and Hubs, referred to herein as "devices", is the way network management—the act of administering a collection of networking devices—handles the slices of configuration that eventually make-up the actual configuration file for each device. The slices, which are portions of a full configuration for one networking device, are stored centrally, perhaps on a server. The different instances of each type of slice are combined to make a full configuration for each networking device, and are then conveyed to each networking device. The "authoritative" copy remains at the central location (a remote server). In order to properly assemble the appropriate slices for each device, information about each device must be maintained on that central store of slices—for example, from FIG. 1, attributes of each device must be known. Rather than specifying a particular networking device's settings as one monolithic whole, according to embodiments of the present invention the settings are described as the union of a collection of configuration slices. Each slice can still be updated, but all devices that reference that slice will then use the newest version of that slice. In this manner, a change to the slice instance is reflected across all devices for which that slice instance is appropriate. The actual method of conveying the resultant, full configuration for a particular device to the actual networking device may include heartbeating, for example. Each slice is version controlled. That is, every single edit of a slice (beginning with its creation) causes a new version to be created. Users can generate differences from one slice version to another to see what has changed. Some users may have permission to edit a slice, thus making a new version of that slice, but may not have permission to deploy that version of the slice to the devices until someone else approves the change (maybe using a difference function to quickly see the proposed changes).

Each feature that is added to device software adds a "template" for the portion of configuration that controls the user-configurable aspects of that feature. Such templates do not have actual values—they merely describe the parameters that could have actual values for that feature. Templates are created by a networking engineer skilled in network management. For example, in the 802.11 template, there exists an Extended Service Set Identifier (ESSID) setting for which a value will be requested. Templates cannot be edited by users. While there is only one 802.11 template, there would typically be several 802.11 "slices". See FIG. 1. A slice is a copy of a template with actual values filled-in for all parameters.

Networking devices may self-select the slice appropriate to their particular environment, as a function of that device's: attributes—presence/absence of an EVDO (telecommunications standard for wireless communications) card, for example; local network surroundings—speed of the wide area network (WAN) link, for example; or perhaps the role of the human end-users which the networking device services. Alternatively, which slices should be used by a particular networking device may be statically declared, although such determinations may be performed in "real-time" based on other up-to-the-second inputs. For example, selection of which particular instance of a slice to use may be based on any, all or different combinations of the following criteria: indirectly based on user repository database values fetched for a particular end-user connected to the network device; based on information the end-user provided when they installed the network device; directly based on statically declared groups of devices; and based on auto-detection performed by the networking device. These criteria are described in detail below.

The following is a description of how a networking device is configured, according to embodiments of the invention. Assume a collection of networking devices have been deployed. As part of the deployment of each device, several data-collection processes are initiated. For the actual networking device itself, the device reports on its attributes—for example which line cards are installed, CPU and memory capacity, or network interface speeds. The networking device also automatically detects its surroundings—for example, it measures the speed of its connection to the Internet, or its geographic location. At the time of device installation, the human installer is queried as to the role of the end-user which this device will service. All of these attributes are conveyed to the central management application, on a remote server, which stores these attributes for each device. Also at that central location are the templates—the definitions of the types of configuration variables that compose a slice. Networking engineers create specific instances of those templates, the slices, and associate instances with different values for the different attributes. For example, a networking engineer might declare a 802.11 wireless template to consist of ESSID, and a pre-shared key to implement a wireless LAN on a networking device. The template does not contain values for those variables, it merely denotes that such values would exist in any slice instantiated from such a template. The networking engineer would also create instances of that template—for example, one instance for wireless settings for workers based out of the Manhattan office, (perhaps ESSID="NYC" and key="BigApple"), and a separate instance/slice for workers based out of the Connecticut office, (perhaps ESSID="CT" and key "CtYankee"). Based on an external database that maps end-users serviced by each networking device to the office they are based out of, the system can assign the appropriate slice to each device. Such assignment is made in a compilation step where for each networking device, the appropriate slices are selected and compiled into one full configuration for that networking device; this process is repeated for each networking device. The resultant configurations are then conveyed to the networking devices. Generally, compilation occurs as initiated by the network manager, typically after one or more changes are made to one or more of the slices and/or network devices are added/removed to/from the system. In the latter case, only the added/removed devices need be recompiled.

Slice Instance Selection Indirectly Based on User Repository Database Values Fetched for a Particular End-User Connected to the Network Device Each network device caches the last end-user to successfully authenticate on that networking device. Attributes found in that end-user's repository database record on the server are used to select appropriate configuration slices. User repository databases, such as Active Directory (AD) may be used. Lightweight Directory Access Protocol (LDAP) may be used for querying and modifying repository databases over TCP/IP. For each slice, an exact AD/LDAP attribute is declared to be the "switch" variable. Here a switch variable may be the variable in a switch statement, as used in modern imperative programming languages, such as C. The end-user also specifies all anticipated values AD might return for that variable and which slice to apply when each is encountered. These end-user specified rules could be as simple as a switch statement, as described above, or more complex. A "default" clause should be provided, and if ever used may trigger an alarm to the network manager(s) informing them that their rules need updating.

For example, assume a company would like to broadcast the same 802.11 Extended Service Set Identifier (ESSID) (and associated authorization/encryption) as the end-user finds in their associated "normal" workplace. If the Manhattan and Connecticut offices have different 802.11 settings, the network manager user would create two 802.11 slices and for the template make the rule:

```
Attribute to use for switch: "AD:normal-work-site"
Connecticut:
   <use "Connecticut office wireless settings" slice instance>
Manhattan:
   <use "Manhattan office wireless settings" slice instance>
default:
   <apply no wireless settings & generate alarm>
```

See FIG. 1. The alarm generation is optional, but for many AD values the intent will be to exhaustively specify which slice to use for all possible values; finding an end-user that has a different "normal-work-site" value indicates there is a bug in the rules or in the AD database that should be addressed. Also, there may be a need for a different "default" clause that is executed if a particular piece of customer premise equipment (CPE) has not been licensed to use a particular feature, which otherwise would not yield a slice and an alarm.

Another example of a slice that may be decided using this AD-indirect method is determination of the Network Time Protocol (NTP) time-zone based on the state found in the end-users home-address AD record.

Slice Instance Selection Based on Information the End-User Provided when they Installed the Network Device As part of the initial installation, the end-user could be prompted for the time-zone for that location. The values provided can be saved by network management software and used as switch values for selecting a slice instance.

Additionally, these end-user provided values may be useful as per-device substitution variables. For example, in a NTP template, the time zone may be set to the value the end-user provided. The "time-zone" setting would be something like $-TIMEZONE-PROVIDED-BY-END-USER-$. (Using the end-user provided time zone value as a switch variable wouldn't work quite as well in this case, as that variable would then select among 4-6 US time zone slices, each slice being identical to the others except for the time zone setting). Networking devices need to have their software updated from time-to-time. In a network composed primarily of 9-to-5 office workers, updating the networking device at 2 or 3 am (local time) is probably the hour least likely to impact an end-user trying to get work done. In a geographically diverse network, the devices may be deployed in different time-zones, and so 2 am (local) occurs at different times. In order to implement such a scheme, a slice that specifies that device updates should occur at 2 am local time needs as an input what time zone that device resides in. While it might be possible to infer the timezone via other methods, assume here that the end-user is asked for this information at the time of installation. The answer the end-user provides is stored in the system on a per-device basis. If you had a network that spanned 4 timezones in the USA, you could solve this with 4 slices that are 99% identical, except that each would specify a different UTC time to apply updates, for example 10 am UTC for devices in the West is 2 am local and 7 am UTC for devices in the East is 2 am local. This would be wasteful and confusing as those slices would be identical except for the exact time to apply updates. Instead, the exact time to apply updates is left as a variable in the slice, (say "$-UPDATE-HOUR-$), and the exact value for the slice is filled-in from the value provided by the end-user when they installed the networking device.

Slice Instance Selection Directly Based on Statically Declared Groups of Devices Not every choice of appropriate slice will be covered indirectly by AD values for the attached end-user. For example, it is highly unlikely that AD would know that Bob's backup cellular broadband provider is Verizon while for Alice and Don the provider is Sprint. See FIG. 1.

Figure 2:
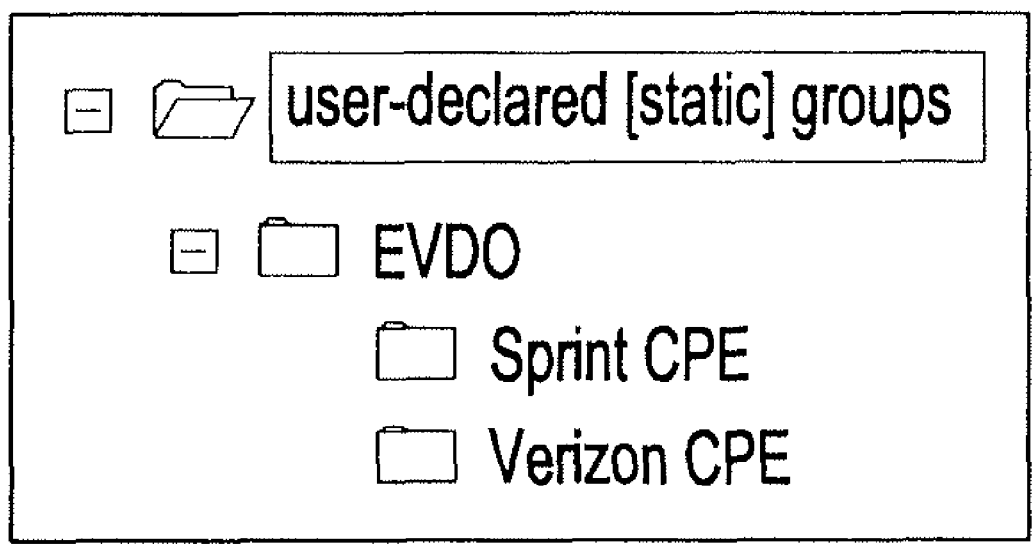
FIG. 2 shows a user repository database configuration, according to embodiments of the invention.

For cases that AD cannot address, the network manager can create "device groups" which are static groupings of CPE that can be used as the condition on which different slices are applied. In order to keep related device-groups together, groups-of-groups may also be permitted. For example, see FIG. 2. In this example, an EVDO template would have a rule that says:

```
Attribute to use for switch: "DEVICE-GROUP: EVDO"
"Sprint CPE": <use "Sprint EVDO settings">
"Verizon CPE": <use "Verizon EVDO settings">
default: <apply no EVDO settings & generate alarm>
```

The default clause should only kick-in if an EVDO card is detected in the network device. When Information Technology issues an EVDO card to an end-user, they also add the end-users' network device to the appropriate group. Because this method of determining the appropriate slice is error-prone and labor intensive, it generally should be used when other methods are unavailable.

Slice Instance Selection Based on Auto-Detection Performed by the Networking Device An alternative approach to slice determination for the above example with the EVDO card may be for the networking device to auto-sense the type of EVDO card and make the card type a switch variable for slice determination.

There may be other things the networking device can auto-detect that would be useful. For example, by determining the domain name system (DNS) prefix of the nearest far-end router (NFER), the networking device may be able to distinguish the provider of the WAN link. (An NFER is the first router encountered on a WAN link, a link connecting a networking device to the Internet, on the "far" side of the WAN link. For example, a home-user often is connected to the Internet via a DSL or Cable modem. The first router encountered on the "far end" of the DSL/cable link is the NFER. A heuristic for automatically detecting the NFER would be to perform a traceroute to a variety of Internet destinations—the farthest-away router that is common to all the resulting paths is the NFER.) For example, given that the NFER on a user's PC is "bras23-10.pltnca.sbcglobal.net", the WAN link provider is clearly SBC. One way such information automatically detected by the networking device could be used would be to deliver a different user agreement or policy to the networking device in the event the user's provider changes from its last known value and/or force the end-user to go through the installation procedure again. This will be useful when the end-user either moves or takes the networking device on vacation with them.

Although the present invention has been particularly described with reference to embodiments thereof, it should be readily apparent to those of ordinary skill in the art that changes and modifications in the form and details may be made without departing from the spirit and scope of the invention. It is intended that the appended claims encompass such changes and modifications. The following claims define the present invention.

What is claimed is:

1. A method comprising:
generating a first instance of a first versioned device configuration slice with first configuration types, including a first configuration type, and first values, including a first value, for the first configuration types;
generating a second instance of the first versioned device configuration slice with the first configuration types and second values, including a second value, for the first configuration types, wherein the first value for the first configuration type is different from the second value for the first configuration type;
generating a first instance, of a second versioned device configuration slice with second configuration types, including a second configuration type, and third values, including a third value, for the third configuration types;
generating a second instance of the second versioned device configuration slice with the second configuration types and fourth values, including a fourth value, for the second configuration types, wherein the third value for the second configuration types is different from the fourth value for the second configuration type;
storing a full configuration for a first network device on the server, the full configuration for the first network device including the first instance of the first versioned device configuration slice and the first instance of the second versioned device configuration slice;
storing a full configuration for a second network device on the server, the full configuration for the second network device including the second instance of the first versioned device configuration slice and the second instance of the second versioned device configuration slice;
conveying the full configuration for the first network device to the first network device;
conveying the full configuration for the second network device to the second network device.

2. The method of claim 1, wherein the first instance of the first versioned device configuration slice is a first version of the first versioned device configuration slice and the first version of the first versioned device configuration slice includes a fifth value of the first values, further comprising:
generating a second version of the first versioned device configuration slice having a sixth value of the first values that is different than the fifth value;
maintaining a record of the first version of the first versioned device configuration slice and the second version of the first versioned device configuration slice, including at least the fifth value and the sixth value and data sufficient to identify a person from which the sixth value was obtained.

3. The method of claim 1, further comprising:
generating an instance of a third versioned device configuration slice comprising a fraction of device configuration that is common across the first network device and the second network device;
storing the full configuration for the first network device including the instance of the third versioned device configuration slice;
storing the full configuration for second first network device including the instance of the third versioned device configuration slice.

4. The method of claim 1, further comprising:
generating a first instance of a third versioned device configuration slice wherein the third versioned device configuration slice is applicable based on a geographic location of a plurality of network devices including the first network device and the second network device;
generating a second instance of the third versioned device configuration slice;
storing the full configuration for the first network device including the first instance of the third versioned device configuration slice based upon a first geographic location of the first network device;
storing the configuration for second first network device including the second instance of the third versioned device configuration slice based upon a second geographic location of the second network device.

5. The method of claim 1, further comprising:
generating a first instance of a third versioned device configuration slice wherein the third versioned device configuration slice is applicable based on roles of human agents which a plurality of network devices, including the first network device and the second network device, service;
generating a second instance of the third versioned device configuration slice;
storing the full configuration for the first network device including the first instance of the third versioned device configuration slice based upon a first role of a first human agent which the first network device services;

storing the full configuration for second first network device including the second instance of the third versioned device configuration slice based upon a second role of a second human agent which the second network device services.

6. The method of claim 1, further comprising:

generating a first instance of a third versioned device configuration slice wherein the third versioned device configuration slice is applicable based on hardware equipment on a plurality of network devices including the first network device and the second network device;

generating a second instance of the third versioned device configuration slice;

storing the full configuration for the first network device including the first instance of the third versioned device configuration slice based upon first hardware equipment on the first network device;

storing the full configuration for second first network device including the second instance of the third versioned device configuration slice based upon second hardware equipment on the second network device.

7. The method of claim 1, further comprising obtaining geographic location data associated with the first network device from a user repository datastore, wherein the geographic location data is a basis for the first value.

8. The method of claim 1, further comprising: obtaining time zone data associated with the first network device from a user repository datastore, wherein the time zone data is a basis for the first value.

9. The method of claim 1, further comprising: obtaining human agent role data associated with the first network device from a user repository datastore, wherein the human agent role data is a basis for the first value.

10. The method of claim 1, further comprising: obtaining network equipment data associated with the first network device from a user repository datastore, wherein the network equipment data is a basis for the first value.

11. The method of claim 1, further comprising: obtaining network device physical attributes data associated with the first network device from a user repository datastore, wherein the network device physical attributes data is a basis for the first value.

12. The method of claim 1, further comprising: obtaining per-user settings data associated with the first network device from a user repository datastore, wherein the per-user settings data is a basis for the first value.

13. The method of claim 1, further comprising: obtaining static grouping of network devices data associated with the first network device, wherein the static grouping of network devices data is a basis for the first value.

14. The method of claim 1, further comprising: obtaining data from an end-user associated with the first network device, wherein the data is a basis for the first value.

15. The method of claim 1, further comprising: obtaining data from the first network device, wherein the data is a basis for the first value.

16. The method of claim 1, further comprising: obtaining data from a system administrator associated with the first network device, wherein the data is a basis for the first value.

17. The method of claim 1, further comprising: obtaining data at a time of network device installation associated with the first network device, wherein the data is a basis for the first value.

18. The method of claim 1, wherein the first instance of a first versioned device configuration slice and the first instance of a second versioned device configuration slice are coherent sub-sections of configuration settings for the first network device.

19. The method of claim 1, wherein the first customer premise equipment (CPE) includes the first network device and second CPE includes the second network device.

20. A computer program product stored on a computer readable device, the product comprising a computer program including code to configure a server computer to:

generate a first instance of a first versioned device configuration slice with first configuration types, including a first configuration type, and first values, including a first value, for the first configuration types;

generate a second instance of the first versioned device configuration slice with the first configuration types and second values, including a second value, for the first configuration types, wherein the first value for the first configuration type is different from the second value for the first configuration type;

generate a first instance of a second versioned device configuration slice with second configuration types, including a second configuration type, and third values, including a third value, for the third configuration types;

generate a second instance of the second versioned device configuration slice with the second configuration types and fourth values, including a fourth value, for the second configuration types, wherein the third value for the second configuration type is different from the fourth value for the second configuration type;

store a full configuration for a first network device on a server, the full configuration for the first network device including the first instance of the first versioned device configuration slice and the first instance of the second versioned device configuration slice;

store a full configuration for a second network device on the server, the full configuration for the second network device including the second instance of the first versioned device configuration slice and the second instance of second versioned device configuration slice;

convey the full configuration for the first network device to the first network device;

convey the full configuration for the second network device to the second network device.

* * * * *